United States Patent
Johnson

(10) Patent No.: US 7,510,142 B2
(45) Date of Patent: Mar. 31, 2009

(54) AERIAL ROBOT

(75) Inventor: Samuel A. Johnson, Loveland, CO (US)

(73) Assignee: Stealth Robotics, Longmont, CO (US)

( * ) Notice: Subject to any disclaimer, the term of this patent is extended or adjusted under 35 U.S.C. 154(b) by 0 days.

(21) Appl. No.: 11/361,122

(22) Filed: Feb. 24, 2006

(65) Prior Publication Data

US 2007/0200027 A1    Aug. 30, 2007

(51) Int. Cl.
*B64C 27/08* (2006.01)
*B64C 29/00* (2006.01)
*B64C 39/00* (2006.01)
*B64C 27/00* (2006.01)

(52) U.S. Cl. .................. 244/17.17; 244/3.1; 244/17.11; 244/17.19; 244/17.21; 244/17.23; 244/75.1; 244/76 R; 244/175

(58) Field of Classification Search ........... 244/3.1–3.3, 244/6–7 C, 12.1–12.6, 17.11–17.27, 23 R–23 D, 244/76 R, 175, 189, 190, 75.1; 342/5–20, 342/52–58, 61–67

See application file for complete search history.

(56) References Cited

U.S. PATENT DOCUMENTS

| | | | | |
|---|---|---|---|---|
| 2,953,321 | A | * | 9/1960 | Robertson et al. ......... 244/23 C |
| 2,995,740 | A | * | 8/1961 | Shreckengost ............... 342/58 |
| 2,996,269 | A | * | 8/1961 | Parry ...................... 244/17.19 |
| 3,053,480 | A | * | 9/1962 | Vanderlip ................. 244/17.13 |
| 3,176,288 | A | * | 3/1965 | Wyatt .......................... 342/58 |
| 4,233,605 | A | * | 11/1980 | Coleman ....................... 342/6 |
| 4,795,111 | A | * | 1/1989 | Moller ...................... 244/23 C |
| 4,808,999 | A | * | 2/1989 | Toman ......................... 342/15 |
| 5,070,955 | A | * | 12/1991 | Lissaman et al. .......... 244/23 A |
| 5,072,396 | A | | 12/1991 | Fitzpatrick et al. |
| 5,152,478 | A | * | 10/1992 | Cycon et al. ............... 244/12.2 |
| 5,289,994 | A | * | 3/1994 | Del Campo Aguilera .... 244/7 B |
| 5,295,643 | A | * | 3/1994 | Ebbert et al. ................ 244/7 B |
| 5,722,618 | A | | 3/1998 | Jacobs et al. |
| 5,752,088 | A | | 5/1998 | Desselle |

(Continued)

OTHER PUBLICATIONS

"Gore Shielded Twisted Pair: Controlled Impedance Wire"; posted on the Internet at gore.com; no author listed; no date listed; publication JK060427-05; last revision Jun. 29, 2007.*

*Primary Examiner*—Bernarr E Gregory
(74) *Attorney, Agent, or Firm*—Holland & Hart

(57) ABSTRACT

An aerial robot is disclosed. The aerial robot may include at least one pair of counter-rotating blades or propellers, which may be contained within a circumferential shroud or a duct. In one embodiment, the aerial robot may have the ability to hover and move indefinitely. Electric power to the robot may be provided by a tether or an on-board power supply. In tethered embodiments, a solid-state, electronic voltage transformer may be used to reduce a high voltage, low current source to lower voltage, higher current source. In one embodiment, secure data communication between a ground unit and the aerial robot is facilitated by impressing high bandwidth serial data onto the high voltage tether wires or a thin optical fiber which is co-aligned with the tether wires. In one embodiment, precise navigational and position controls, even under extreme wind loads, are facilitated by an on-board GPS unit and optical digital signal processors. In one embodiment, if the tether detaches, precision free-flight is possible with on-board batteries.

35 Claims, 8 Drawing Sheets

U.S. PATENT DOCUMENTS

| | | |
|---|---|---|
| 5,757,157 A | 5/1998 | Falk et al. |
| 6,086,014 A | 7/2000 | Bragg, Jr. |
| 6,170,778 B1 | 1/2001 | Cycon et al. |
| 6,325,330 B1 | 12/2001 | Lavan, Jr. |
| 6,364,253 B1 * | 4/2002 | Cavanagh .................. 244/190 |
| 6,567,044 B2 | 5/2003 | Carroll |
| 6,845,939 B1 | 1/2005 | Baldwin |
| 6,931,247 B2 | 8/2005 | Cox et al. |

* cited by examiner

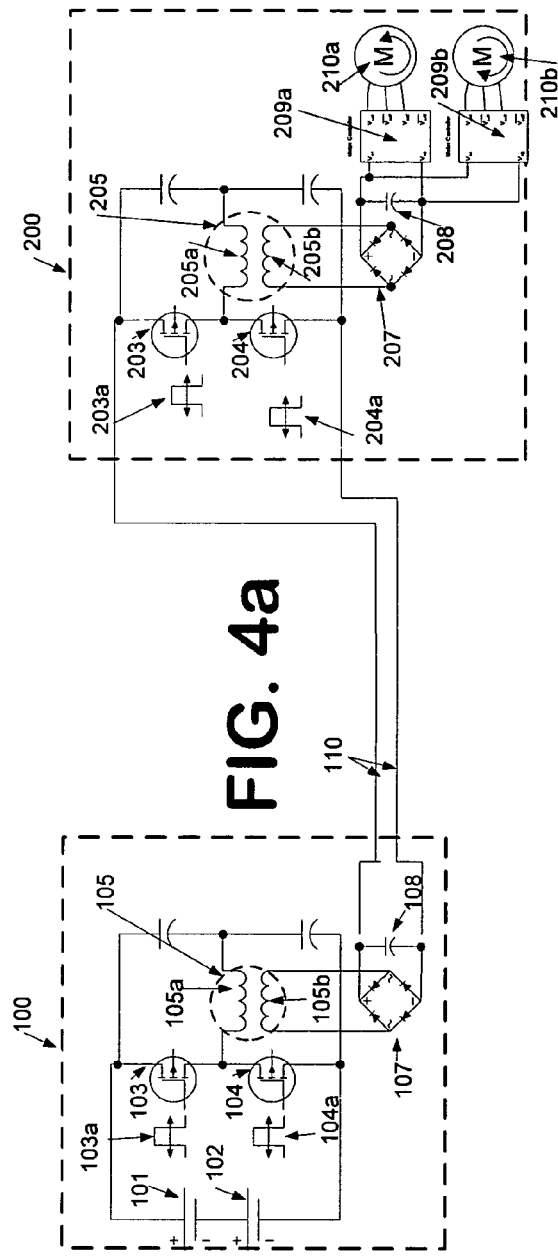
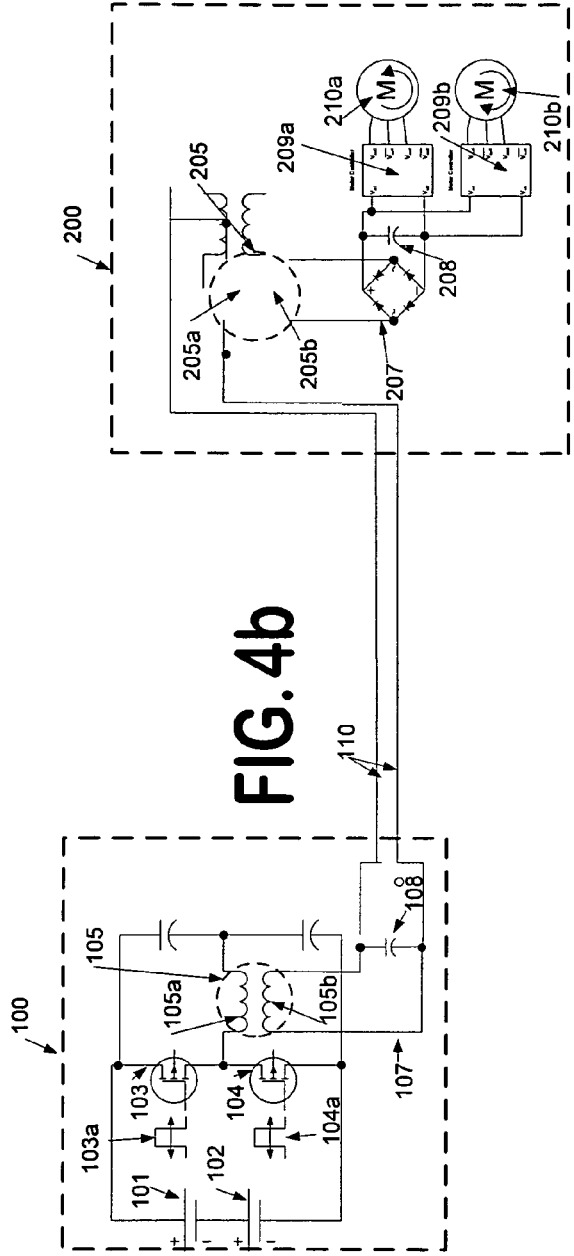

AERIAL ROBOT

TECHNICAL FIELD

The preset disclosure relates to the field of unmanned aerial vehicles (UAVs), aerostats, lighter-than-air ships, and to aerial remote imaging, sensing, and broadcasting.

BACKGROUND

Remotely controlled aerial observational and broadcasting platforms or UAVs are known to provide video and infrared observation and surveillance of persons, industrial equipment, and security environments. UAVs are sometimes used by military and governmental agencies to survey large territories by air. Some UAVs operate over ranges extending thousands of miles. However, conventional UAVs must operate like airplanes and therefore must fly at moderate to high speeds. It is difficult or impossible for conventional UAVs to park in a stationary position over an observed area for extended periods. In some cases, radio-controlled model helicopters, fitted with wireless cameras, have been used for close inspection, but they can only hover for limited periods. Fuel capacity limits flight time for conventional UAV's, and radio-controlled helicopters require highly skilled human pilots on the ground with a clear line of sight. In addition, radio-controlled helicopters are vulnerable to wind gusts, and can be easily destroyed by a rotor strike.

Conventional aerostats, or lighter-than-air-ships, have the ability to remain aloft for extended periods. However, aerostats are typically large and unwieldy. Moreover, aerostats are greatly affected by winds aloft, and lack maneuverability.

In some circumstances, rather than using UAVs or aerostats for surveillance, some use free standing poles or aerial towers. Poles or towers provide a high vantage point for remote observation, but each must be constructed on permanent piers, employ stabilizing wires for extended heights, and are conspicuous visual detractors to those nearby.

UAVs typically rely on wireless radio communication technologies for command, control, and data transmission. However, radio communications are susceptible to intentional and unintentional jamming, and can be easily compromised by persons of modest equipment desiring to intercept the information and data being broadcast. Radio communication also provides a limited bandwidth capacity for data transfer.

In addition, conventional UAVs are not well suited for use in confined spaces. For example, a typical UAV is not operational through small passageways such as indoor halls, ductworks, caves, and crevices. Therefore, there is a need for an aerial observational platform that is easy to install and operate. Further, there is a need for an aerial robot that can discretely and quietly hover for indefinite periods while holding position, and can transmit data from sensors over a secure connection.

SUMMARY

The principles described herein may address some of the above-described deficiencies and others. Specifically, some of the principles described herein relate to aerial robots, some embodiments of which may be suited for remote observation, environment detection, device delivery, communication, and other applications.

One embodiment provides an apparatus comprising an aerial robot. The aerial robot comprises a first propeller for rotating in a first direction, a second propeller rotating in a second direction opposite of the first direction, and an observation device. The apparatus includes a power supply and a transmission line interconnecting the power supply and the aerial robot. In one embodiment, the transmission line transmits power to the aerial robot and provides bi-directional communication to and from the aerial robot.

In one embodiment, the transmission line comprises a controlled impedance wire. In one embodiment, the transmission line comprises an electrical power line and an optical fiber communication line. In one embodiment, the aerial robot further comprises an internal spool, and at least a portion of the transmission line is wound on the internal spool. In one embodiment, the aerial robot further comprises an internal spool, where at least a portion of the electrical transmission line is wound on the internal spool and the transmission line comprises a tether wire pair. In one embodiment a nominal diameter of each wire of the tether wire pair is 0.010 inches or less and is covered with a dielectric insulator. In one embodiment the transmission line provides power to the aerial robot at a voltage of 500V or higher or 1000V or higher.

In one embodiment, the aerial robot comprise an internal duct comprising an inlet and an outlet. The first and second propellers are disposed in the internal duct and first and second movable air foils at the outlet of the internal duct control movement of the aerial robot.

In one embodiment, the aerial robot comprises dimensions no greater than four inches by four inches by seven inches. In one embodiment, the aerial robot and the power supply each comprises a spool connected to the transmission line, and at least one of the spools is powered.

In one embodiment, the observation device comprises at least one of: a camera, a sensor, a speaker, a sniffer, and a microphone. In one embodiment, the aerial robot comprises a delivery device which may, for example, include an arm, box, telephone, or holder.

In one embodiment, the aerial robot comprises an active noise reduction system. In one embodiment, the active noise reduction system comprises at least two microphones, a digital signal processing microprocessor, and a speaker. In one embodiment, the aerial robot comprises a control system for providing hover stability, the control system comprising a microprocessor, a micro-machined gyroscope, and a micro-machined accelerometer. In one embodiment, the aerial robot comprises a flight control system, the flight control system comprising an optical digital signal processor circuit capable of maintaining aerial robot position while optically referenced to a ground object. In one embodiment, the aerial robot comprises a self contained power source and wireless control sensors for remote guided flight when untethered.

One embodiment provides an apparatus comprising a flying robot. The flying robot comprises a body, an internal duct through the body, at least one pair of counter-rotating propellers disposed in the internal duct, first and second remotely operated control fins, and a gyroscope. The dimensions of the flying robot may not exceed approximately six inches by six inches by eight inches. In one embodiment, the dimensions of the flying robot do not exceed a cylinder having a diameter of five inches and a height of seven inches. In one embodiment, the dimensions of the flying robot do not exceed a cylinder having a diameter of four inches and a height of six inches. In one embodiment, the flying robot comprises a radio broadcast antenna. In one embodiment, the apparatus further comprises a tether connected to the flying robot, the tether comprising a power transmission line and a bi-directional communication line. The tether may be several thousand feet long or longer. In one embodiment, the flying robot comprises a device delivery holder. In one embodiment, the flying robot comprises a spool and a tether at least partially wound on the spool, the tether comprising a power transmission and a bi-directional communication line. In one embodiment, the flying robot comprises an on-board camera remotely movable to multiple positions with respect to the flying robot.

One embodiment provides an apparatus, the apparatus comprising an aerial robot, a remote communication center, and a secure communication link connected between the aerial robot and the remote communication center. The aerial robot comprises a body, at least one pair of counter-rotating propellers mounted to the body, and an observation device mounted to the body. In one embodiment, the secure communication link comprises a controlled impedance wire of 35 gauge or smaller. In one embodiment, the secure communication link comprises a fiber optic cable. In one embodiment, the aerial robot comprises a powered rotating spool and at least one thousand feet of wire wound on the spool. In one embodiment, the aerial robot comprises an internal duct inside the body, the internal duct comprising an inlet and an outlet, wherein the at least one pair of counter-rotating propellers are disposed in the internal duct, and first and second orthogonal, movable airfoils at an outlet of the internal duct to control movement of the aerial robot. In one embodiment, the aerial robot comprises a cylinder having a diameter of no more than five inches and a length of no more than eight inches.

In one aspect, there is a method of flying an aerial robot comprising counter rotating a pair of aerial robot propellers, navigating the aerial robot through a confined space, powering the aerial robot with a tether, and securely communicating bi-directionally with the aerial robot.

BRIEF DESCRIPTION OF THE DRAWINGS

The accompanying drawings illustrate certain embodiments discussed below and are a part of the specification.

FIG. 4A is a schematic representation of high voltage command and control circuits on either side of a high voltage DC tether according to one embodiment.

FIG. 4B is a schematic representation of high voltage command and control circuits on either side of a high voltage AC tether according to one embodiment.

Throughout the drawings, identical reference characters and descriptions indicate similar, but not necessarily identical elements.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

As used throughout the specification and claims, the term "foil" or "airfoil" means a part or surface, such as a wing, propeller blade, or rudder, whose shape and orientation control stability, direction, lift, thrust, or propulsion. A "propeller" is a machine for propelling an aircraft or boat, comprising a power-driven shaft with radiating blades that are placed so as to thrust air or water in a desired direction when spinning. The words "including" and "having," as used in the specification, including the claims, have the same meaning as the word "comprising."

Figure 1:
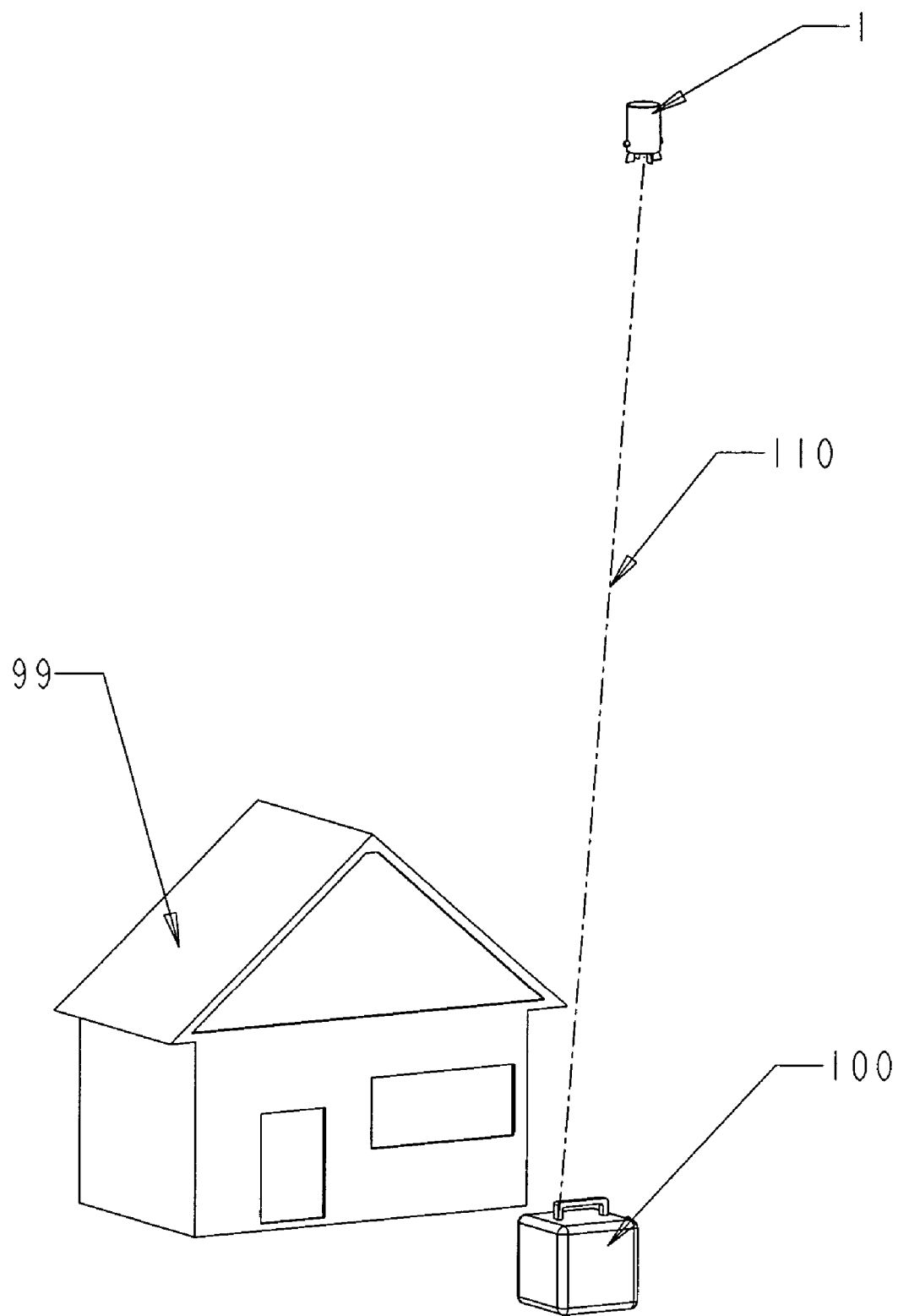
FIG. 1 is a perspective view of an aerial robot in relation to a surface structure according to the one embodiment.

Turning now to the figures, and in particular to FIG. 1, one embodiment of an aerial robot is shown. According to the embodiment of FIG. 1, the aerial robot comprises an aerial robotic lifting and observational platform 1. The aerial robotic lifting and observational platform 1 is shown in relation to a power supply or communication center such as a powered ground station 100. In one embodiment, the powered ground station 100 provides electrical power to the aerial robotic lifting and observational platform 1 via a transmission line such as tether 110. In one embodiment, the tether 110 also provides single or bi-directional data communication between the aerial robotic lifting and observational platform 1 and the powered ground station 100. FIG. 1 also illustrates a ground structure 99, which the aerial robotic lifting and observational platform 1 is hovering above and may be observing.

In one embodiment, the powered ground station 100 comprises one or more large batteries or a generator. In one embodiment, the powered ground station 100 comprises or is connected to an external power source such as the electrical grid system that is ubiquitous in modern life. In embodiments wherein the powered ground station 100 comprises or is connected to the electrical grid, flight time for the aerial robotic lifting and observational platform 1 becomes unlimited. In addition to providing power to and data transfer with the aerial robotic lifting and observational platform 1, the powered ground station also includes remote controls for operating the aerial robotic lifting and observational platform 1. Therefore, the aerial robotic lifting and observational platform 1 is operated by remote control and is maneuverable through confined spaces including movement through doors, windows, ducts, hallways, caves, cracks, manways, and other passageways in the ground structure or any other structure. In one embodiment, the ability to maneuver for long periods or even indefinitely through confined spaces is enabled in part by unspooling the tether 110 from a spool 17 (FIG. 2, described in more detail below) carried by the aerial robotic lifting and observational platform 1. According to one embodiment, the spool 17 is powered and can therefore both take up and unwind the tether 110 as the aerial robotic lifting and observational platform 1 moves. In one embodiment, the spool 17 is free floating.

Figure 2:
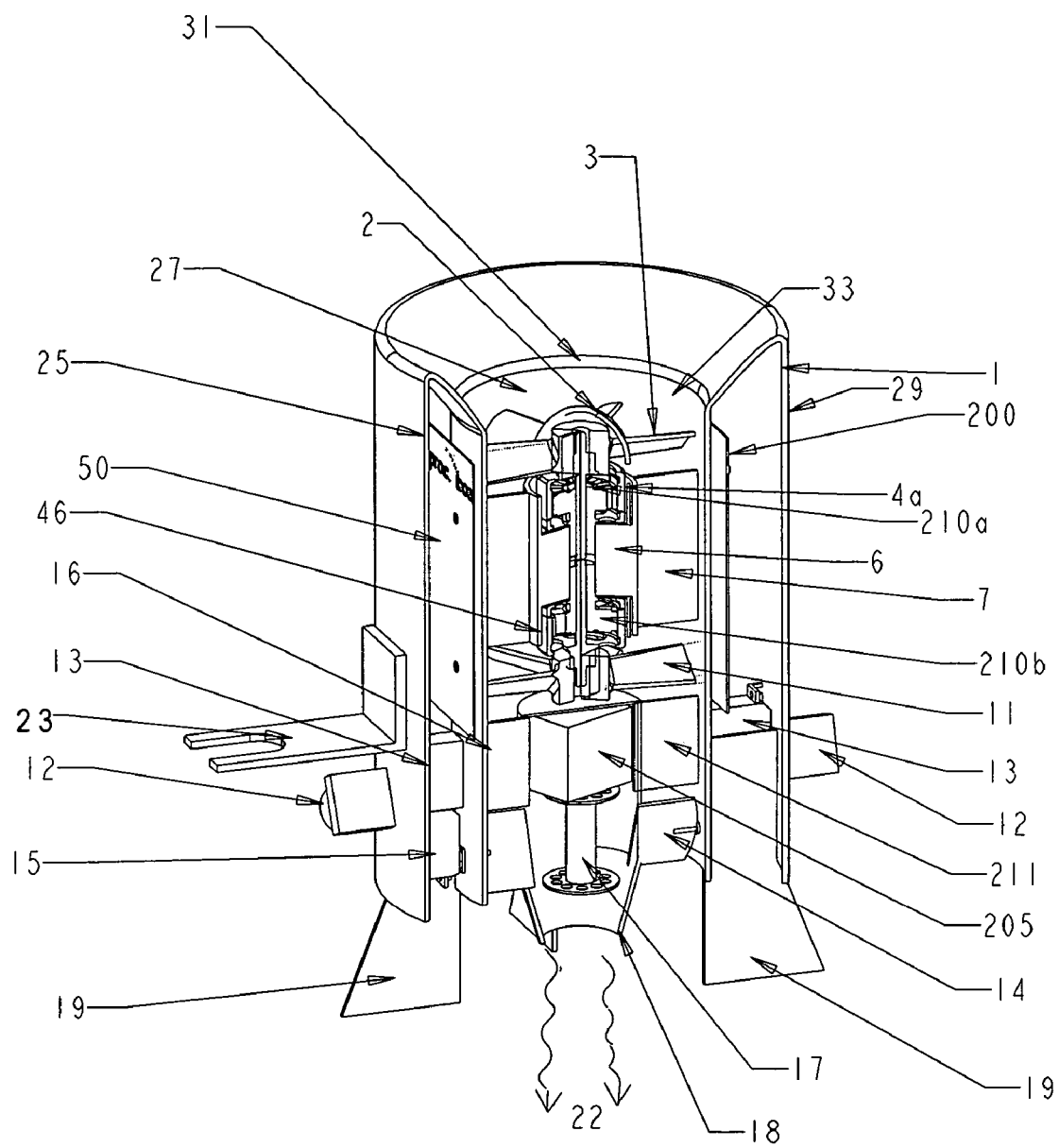
FIG. 2 is a cut away perspective view of one embodiment of a aerial robot illustrating many of the internal components.
Figure 3:
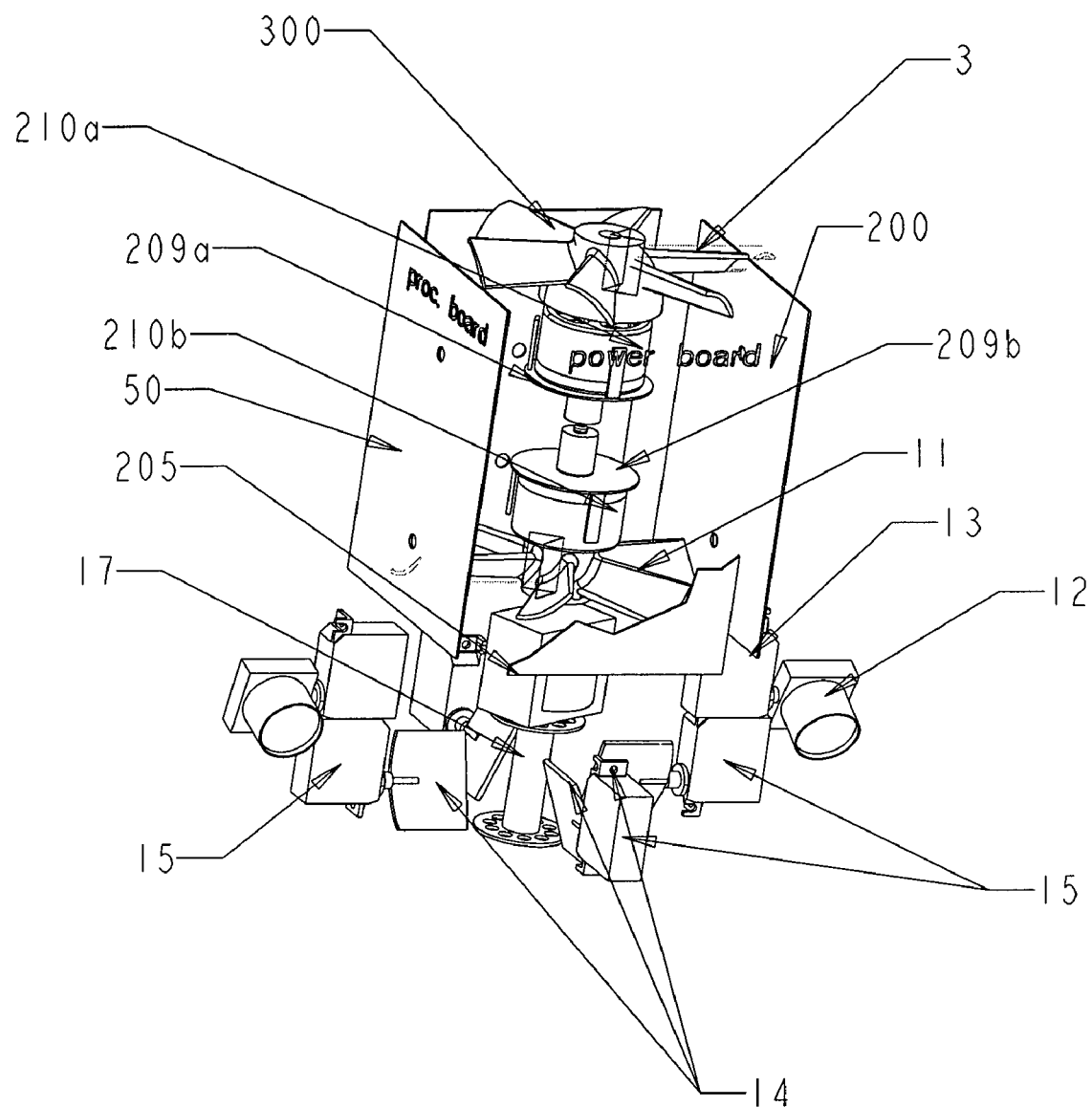
FIG. 3 is an internal perspective view of one embodiment of the aerial robot without a duct to more clearly illustrate certain hidden internal components.

FIGS. 2 and 3 illustrate one embodiment of the aerial robotic lifting and observational platform 1 in cut-away views. FIG. 2 illustrates a body 25 of the aerial robotic lifting and observational platform 1. In FIG. 3, the body 25 is removed to more clearly show some of the internal components of the aerial robotic lifting and observational platform 1. In one embodiment, the body 25 comprises a circumferential or cylindrical shroud and defines an internal air passageway or duct 27. In one embodiment, the body 25 includes an outside surface 29, and inside surface 31, and a hollow annulus 33 between the inside and outside surfaces 29, 31. In one embodiment, the body 25 comprises metal or other structural material. In one embodiment, the orthogonal dimensions of the body 25 do not exceed approximately six inches by six inches by eight inches. These small dimensions allow the aerial robotic lifting and observational platform 1 to maneuver through small, tortuous paths including building ductwork and other confined spaces. Small dimensions of the aerial robotic lifting and observational platform 1 also facilitate portability. In one embodiment, the orthogonal dimensions of the body 25 do not exceed approximately four inches by four inches by seven inches. In one embodiment, the orthogonal dimensions of the body 25 do not exceed approximately four inches by four inches by 5.7-6.0 inches. In one embodiment wherein the body 25 comprises a cylindrical shroud, the dimensions of the body 25 do not exceed a cylinder having a diameter of approximately five inches and a height of approximately seven or eight inches. In one embodiment, the dimensions of the body 25 do not exceed a cylinder having a diameter of approximately four inches and a height of approximately six inches.

In one embodiment, a central structural hub 6 is rigidly connected to the body 25. The central structural hub 6 may comprise one or more webbings or vanes 7 connected to the body 25. In one embodiment, first and second electric motors 210a, 210b are mounted to the central structural hub 6.

In one embodiment, the first and second electric motors 210a, 210b are brushless direct current (BLDC) motors, but other motors may also be used. The first and second electrical motors 210a, 210b may be coaxial with one another and coaxial with the body 25. In one embodiment, the first and second electrical motors 210a, 210b are three phase wound stationary rotor type motors. Stationary rotor windings are mounted to the stationary central structural hub 6. In one embodiment, a first rotating permanent magnet bell assembly 4a of the first motor 210a is carried by conventional ball bearings (not shown), and is attached directly to a first fan or propeller 3. Similarly, in one embodiment, a second rotating permanent magnet bell assembly 4b of the second motor 210b is attached directly to a second fan or propeller 11. However, other power transmission arrangements between the first and second motors 210a, 210b and the first and second propellers 3, 11 may also be used. In one embodiment, the first propeller 3 rotates in a first direction, for example a clockwise direction. The second propeller 11 rotates in a second direction opposite of the first direction, for example a counterclockwise direction. Therefore, the first and second propellers may comprise a first counter-rotating pair of propellers. Additional propellers may be included in some embodiments.

In order to create a physically small and compact lifting and observational platform as described herein in one embodiment, ducted propellers 3, 11 may be used. Ducted propellers 3, 11 provide higher thrust-to-diameter ratios than open propellers. Nevertheless, in some embodiments wherein a larger lifting and observational platform can be tolerated, first and second propellers 3 and 11 may be replaced with larger, slower turning propellers of conventional high length-to-chord-width design. Such larger propellers may comprise two or three blades or more.

As suggested above, first and second motors 210a, 210b, and thus the first and second propellers 3, 11, are counter-rotating with respect to the central structural hub 6. A counter-rotating set of propellers can provide a zero net torque acting on the entire assembly, and allows the aerial robotic lifting and observational platform 1 to operate in some embodiments without large, additional, counter-acting thrust control surfaces. Nevertheless, by modulating the power to the first and second motors 210a and 210b with control electronics, small positive or negative net torques may be momentarily created to rotate the entire aerial robotic lifting and observational platform 1.

As mentioned above, in one embodiment, the vanes 7 attach the central structural hub 6 to the body 25. In addition, the vanes 7 may straighten the high swirl airflow resulting from the rotating propellers 3, 11.

In one embodiment, an aft tail-cone assembly 18 is arranged beneath the central structural hub 6 and the associated first and second propellers 3, 11. In one embodiment, the aft tail-cone assembly 18 includes straightening vanes 16. The straightening vanes 16 center and position the tail-cone assembly 18 in the high velocity airstream 22 created by the first and second propellers 3, 11. The aft tail-cone assembly 18 may also include a spool 17 discussed in more detail below.

In one embodiment, the aerial robotic lifting and observational platform 1 includes a magnetic voltage reducing transformer 205. In one embodiment, the magnetic voltage reducing transformer 205 is located within an outer sheath 211 of the aft tail-cone assembly 18. The magnetic voltage reducing transformer 205 is shown as part of a solid state electronic or high frequency passive transformer system shown in FIGS. 4A and 4B (discussed in more detail below).

In one embodiment, the magnetic voltage reducing transformer 205 is placed adjacent to the high velocity airstream 22 as shown in FIG. 2. In compact embodiments of the aerial robotic lifting and observational platform 1, the size of the magnetic voltage reducing transformer 205 can be minimized. Forced air from the high velocity airstream 22 cools the high frequency magnetic voltage reducing transformer 205 material and thus allows substantially more power throughput for a given volume of magnetic core and windings.

As mentioned above, some embodiments of the tail-cone assembly 18 comprise the spool 17 for holding, winding, and unwinding the tether 110. In one embodiment, the spool 17 is generally cylindrical. Initially, the spool 17 may have several thousand turns of small diameter twisted wire pair or coaxial cable comprising the tether 110. The spool 17 may hold several thousand feet of tether 110. In one embodiment, the spool 17 holds one to three miles of tether 110 or more. In one embodiment, individual wires of a twisted wire pair each comprise a nominal small 0.005 inch diameter (35 gage). In one embodiment the individual wires are insulated with a thin polymer dielectric insulation coating specified to have a breakdown voltage substantially greater than the voltage the tether 110 is designed to carry. In one embodiment, the weight of a 35 gage twisted wire pair is approximately 47 grams per thousand feet. The spool 17 may also or alternatively carry a known or controlled impedance micro-coaxial cable. In one embodiment carrying a micro-coaxial cable, a single inner axially aligned conductor is covered with a thin coating of insulative dielectric coating, then subsequently surrounded by an annular outer conductor. In some embodiments, the annual outer conductor comprises a woven pattern, tape, or other metallic covering.

In one embodiment, the weight of a 35 gage coaxial cable is only 100 grams per thousand feet. A micro-coaxial high frequency cable of nominal outside diameter of 0.010 inches may carry over 1000 watts of thru power, at a voltage of 5,000 volts. In one embodiment, over a 1000 foot interval, the twisted wire pairs or micro-coaxial cables carry a current of only 200 milli-amperes and dissipate less than 24 watts.

In one embodiment, the spool 17 is forced-air cooled by the airstream 22. Therefore, the tether 110 remains cool even when fully wound on the spool 17. As part or all of the tether 110 is unspooled, the unspooled portion is cooled by ambient air and also remains cool.

In one embodiment, a second or additional spool (or other tether deployment device) may be contained within the powered ground station 100 (FIG. 1). A second or additional tether deployment and retraction tether at the powered ground station 100 facilitates rapid retraction of the aerial robotic lifting and observational platform 1. Rapid retraction may be necessary in the event of adverse whether, a need to make a sudden altitude change, or other circumstance.

FIGS. 2 and 3 illustrates pitch and yaw servomotors 15. In one embodiment, there are one or more small servomotors 15 per axis to be controlled. In one embodiment, one servomotor 15 is connected to an associated air foil, aileron, or control fin 14. In one embodiment, the control range of the control fins 14 is approximately +/±15 degrees from the direction of the high velocity airstream 22. According to some embodiments, there may be four orthogonal control fins 14.

In one aspect, the aerial robotic lifting and observational platform 1 is usually operated under a tether condition. Therefore, only small control fin 14 movements may be necessary to hold position on each axis, or to accelerate to a different orientation. However, the control fins 14 facilitate directional control in the event of operation with a detached tether wire (during which time power is provided by an on-board power supply board 200).

In one embodiment, observation devices 12 are mounted to the aerial robotic lifting and observational platform 1. The observation devices 12 may comprise video or IR cameras, sensors, microphones, speakers, device holders, or other implements. For example, the observation devices 12 may comprise a video camera imaging devices attached to another set of tilting servomotors 13. Due in part to the ability of the aerial robotic lifting and observational platform 1 to rotate about its horizontal and vertical axes, complete camera coverage for objects to be observed can be accommodated with a tilt function implemented by the servo motors 13. Additional camera degrees of freedom, such as focus, zoom, roll, etc., may also be easily accomplished by providing for additional camera actuators. Another useful imaging accessory comprising the observation device 12 may be a camera providing images in the far infrared, thereby allowing for discrimination of heat sources such as persons, animals, vehicles, etc. The observation devices 12 may comprises sensors for detecting various gases, particulates, fluids, or other matter.

In one embodiment, an airstream outlet of the aerial robotic lifting and observational platform 1 comprises a plurality of support fins 19. In the embodiment shown in FIGS. 2 and 3, there are four orthogonal support fins 19. The support fins 19 provide clearance for the tailcone 18 assembly before liftoff and when the aerial robotic lifting and observational platform 1 must land. The support fins 19 may also provide clearance on a horizontal surface when the aerial robotic lifting and observational platform 1 is operated in a non-flying mode.

Referring next to FIG. 4A, a schematic representation of the electronic power supply system for the aerial robotic lifting and observational platform 1 is shown. As mentioned above, powered ground station 100 may comprise a power supply. FIG. 4A illustrates one implementation of a power supply for the powered ground station 100 that converts a low voltage DC source (e.g. approximately 12 to 48 volts), high current battery 101 or secondary supply 102 into a high voltage, low current source carried by the tether wires 110.

Many well known transformer designs including, but not limited to: an electronic inverter, a flyback boost, a half bridge, and a full bridge may be used to transform low voltage, high current power to high voltage, low current power in an efficient manner. In some embodiments, a half bridge or full bridge design is adequate. As shown in the embodiment of FIG. 4A, Mosfet switches 103 and 104 alternately switch on and off, thereby inducing a magnetic transformer primary coil with a square wave voltage of RMS (root mean square) DC magnitude of one-half of the DC voltage supplied by the batteries 101 or the secondary DC source 102. The voltage across a transformer primary coil 105a of transformer 105 is amplified (by a primary-to-secondary turns ratio) to a new higher voltage across secondary windings 105b. In one embodiment, a diode rectifier bridge 107 converts high frequency sinusoidal voltages in the range of 20 kilo-hertz to 5 mega-hertz into a pulsating direct current, and a smoothing capacitor 108 provides a low ripple, nearly constant, high voltage DC that is transmitted by the tether 110. It will be understood by one of ordinary skill in the art having the benefit of this disclosure that protective circuits, voltage and current regulation circuits, noise reduction circuits, cooling apparatus, etc., may also be added to the circuitry of the DC power supply comprising the powered ground station 100.

In one embodiment, voltages carried by tether 110 range between approximately 100 and 5000 volts, depending on many variables, including the thrust desired from the aerial robotic lifting and observational platform 1 (FIG. 1), its payload carrying capacity, and operational environmental conditions, etc. In some embodiments, the voltage carried by the tether 110 ranges between approximately 500 and 2000 volts. In one embodiment, the voltage carried by the tether 110 ranges between approximately 1000 and 1500 volts.

Continuing to refer to FIG. 4A, embodiments providing a high voltage direct current for transmission by the tether 110 may be accompanied by the solid state electronic voltage reducing transformer 205 of power supply 200. The power supply 200 is packaged aboard the aerial robotic lifting and observational platform 1 (FIG. 2). Many well known electronic inverter, flyback boost, half bridge, and full bridge designs may facilitate transformation in an efficient manner. In one embodiment shown in FIG. 4A, a half bridge design is adequate. As shown in FIG. 4A, Mosfet switches 203, 204 alternately switch on and off. Switching the Mosfet switches 203, 204 on and off induces a square wave voltage having a magnitude of one-half of the DC voltage of the tether 110. The voltage across a transformer primary coil 205a is reduced by the transformer 205 primary-to-secondary turns ratio, to a new lower voltage across secondary windings 205b. A diode rectifier bridge 207 converts the 20 kilo-hertz-5 mega-hertz high frequency sinusoidal voltage into a pulsating direct current, while a smoothing capacitor 208 provides for a low ripple, nearly constant low voltage direct current. The low voltage direct current may be received, for example, by the control electronics shown in FIG. 5, the first and second motors 210a, 210b, the servomotors 13, 15 (FIG. 2), the observation device 12 (FIG. 2), and any other powered components.

It will be understood by one of ordinary skill in the art having the benefit of this disclosure that protective circuits, voltage and current regulation circuits, noise reduction circuits, cooling apparatus, etc., may also be added to the power supply 200 circuitry of FIG. 4A to facilitate reliable operation of such a high voltage-to-lower voltage DC power supply. In one embodiment, the heat producing components, such as the Mosfet switches 203, 204, the transformer 205, and the diode rectifier 207, are arranged in or adjacent to the high speed airstream 22 (FIG. 2). The arrangement of the heat producing components in or adjacent to the cooling airstream 22 (FIG. 2) facilitates smaller sizes and weights for these components. In one embodiment, the power supply 200 weighs just 30 grams, including the transformer 205.

In one embodiment, the power supply 200 may also include an energy storage device. For example, the capacitor 208 may comprise an energy storage device. The capacitor or energy storage device 208 may be sized to provide adequate power to the aerial robotic lifting and observational platform 1 (FIG. 1) for a limited-duration un-tethered flight. An un-tethered flight may result from an intentional or unintentional disconnection from the tether 110. The capacitor or energy storage device 208 may include, but is not limited to: a super-capacitor, chemical batteries, and a miniature on-board fuel powered DC generator.

FIG. 4B illustrates another embodiment for a power system 100/200. FIG. 4B represents an high frequency alternating current (AC) power system. The tether 110 associated with the AC power system of FIG. 4B may be of known or controlled impedance. Coaxial cables, as well as twisted pair conductors separated by an insulating dielectric, may provide the tether 110 with known or controlled impedance. A controlled-impedance tether 110 allows power from a high frequency power source to be impedance-matched with the tether 110 to optimize the coupling of power. Transforming high voltage radio frequency power at high intrinsic power levels is well known to radio design engineers having the benefit of this disclosure.

In the embodiment of FIG. 4B, the receiving transformer 205 may also be impedance matched to efficiently receive high frequency power from the impedance-controlled tether 110. It will be understood by those of ordinary skill in the art having the benefit of this disclosure that an impedance-controlled cable having only two conductors is inherently self-shielding against the generation or reception of radio frequency nose and interference (RFI). RFI created by current flowing in one direction of a wire is equally and oppositely counteracted (and nullified) by the return current flowing oppositely in the adjacent wire. Impedance-controlled cables are inherently shielded against the creation or reception of unwanted RFI signals, and they provide a secure and RFI-free method of transferring sensitive data and information. This feature may be important for applications in which data sent to and from the aerial robotic lifting and observational platform 1 (FIG. 2) must be kept secret or secure from outside persons or agencies.

The powered ground station 100 represented in FIG. 4B is a solid state electronic power supply and is packaged to be carried aboard the aerial robotic lifting and observational platform 1 (FIG. 2). Again, many well-known transformer designs including, but not limited to: an electronic inverter, a flyback boost, a half bridge, and a full bridge may be used to transform low voltage, high current power to high voltage, low current power in an efficient manner. In one embodiment, a half bridge or radio frequency amplifier design is adequate. As shown in FIG. 4B, Mosfet switch pairs 103, 104 alternately switch on and off, thereby inducing across the tuned magnetic transformer primary coil 105b a high purity single frequency sine wave. The high frequency sine wave is efficiently coupled by impedance matching to the tether 110. Likewise, the magnetic transformer 205 is impedance matched to the tether 110 to efficiently convert the high voltage cross windings 205a to a lower voltage delivered across windings 205b. The diode rectifier bridge 207 converts the 20 kilo-hertz to 2 mega-hertz high frequency sinusoidal voltage into a pulsating direct current, while smoothing capacitor 208 provides for a low ripple, nearly constant low voltage direct current to the control electronics represented in FIG. 5. The low voltage direct current may also be provided to the first and second motors 210a, 210b, the servomotors 13, 15 (FIG. 2), and any other powered components (such as the observation device 12 (FIG. 2).

It will be understood by one of ordinary skill in the art having the benefit of this disclosure that protective circuits, voltage and current regulation circuits, noise reduction circuits, cooling apparatus, etc., may also be added to the power supply 200 circuitry of FIG. 4B to facilitate reliable operation of such a high voltage-to-lower voltage AC-to-DC power supply. In one embodiment, the heat producing components, such as the Mosfet switches 203, 204, the transformer 205, and the diode rectifier 207, are arranged in or adjacent to the high speed airstream 22 (FIG. 2). The arrangement of the heat producing components in or adjacent to the cooling airstream 22 (FIG. 2) facilitates smaller sizes and weights for these components. In one embodiment, the power supply 200 weighs just 30 grams, including the transformer 205.

In one embodiment, the power supply 200 of FIG. 4B may also include an energy storage device. For example, the capacitor 208 may comprise an energy storage device. The capacitor or energy storage device 208 is sized to provide adequate power to the aerial robotic lifting and observational platform 1 (FIG. 1) for a limited-duration un-tethered flight. An un-tethered flight may result from an intentional or unintentional disconnection from the tether 110. The capacitor or energy storage device 208 may include, but is not limited to: a super-capacitor, chemical batteries, and a miniature on-board fuel powered DC generator.

Figure 5:
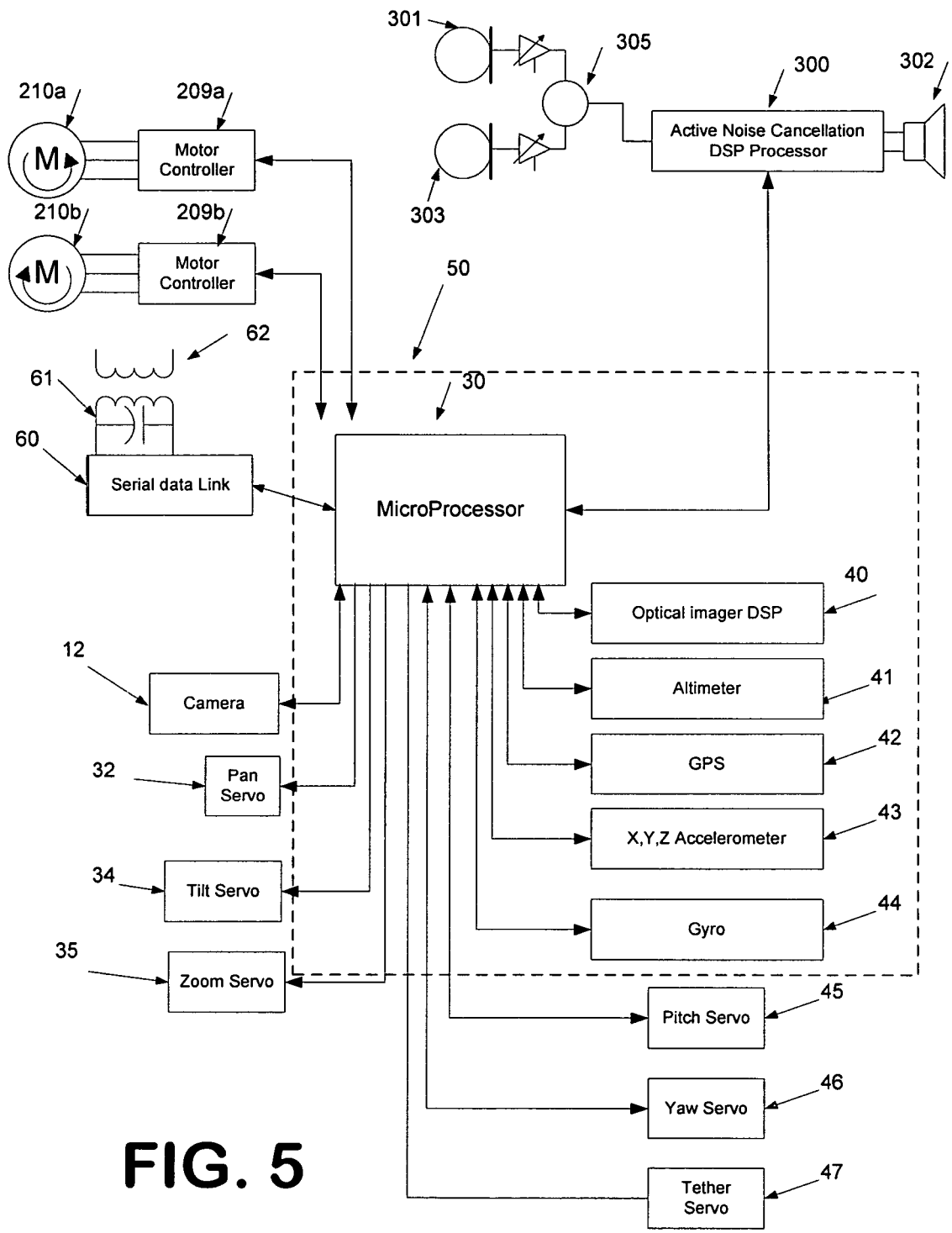
FIG. 5 is a schematic representation of control and sensor circuits of the aerial robot of FIG. 2 according to one embodiment.

FIG. 5 is an electronics and control schematic block diagram for the aerial robotic lifting and observational platform 1 (FIG. 2) according to one embodiment of the present invention. In one embodiment, a microprocessor 30 manages the collection, scheduling, computation, transmission, and receipt of data. A serial link 60, which may comprise a commercially available twisted pair transceiver integrated circuit, is capable of secure transmission and receipt of data placed on the tether 10 (FIG. 1).

Voltage isolation may be facilitated by a variety of techniques known to those of ordinary skill in the art having the benefit of this disclosure. In one embodiment, tuned magnetically isolated windings 61, 62 reject all noise and frequencies that are not within a desired MBPS (mega bits per second) data transmission packet range. In some embodiments, voltage is isolated by capacitive isolation or electro-optical isolation employing optical isolator integrated circuits.

In one embodiment, the tether 110 (FIG. 1) comprises an optical fiber data transmission link. In one embodiment, an optical fiber is coaxially placed with any power transmission lines of the tether 110, and may be coiled onto the spool 17 (FIGS. 2-3). The optical fiber link or another communication link, in combination with a control system such as the one described below, may facilitate maintaining the position of the aerial robotic lifting and observational platform 1 (FIG. 2) while optically referenced to a ground object.

In one embodiment, one or more on-board data sensors may communicate with the microprocessor 30 as shown in FIG. 5. For example, a gyroscope 44 may continuously measure and integrate the angular rotation of the aerial robotic lifting and observational platform 1 (FIG. 2). The gyroscope 44 may comprise a micro-machined silicon integrated circuit available, for example, from Analog Devices (ADI-16300 300 degrees per second gyroscope). The microprocessor 30 may continuously receive data from the gyroscope 44 and may compute and direct any needed correction to one or more of the electric motor controllers 209, 209b. The microprocessor 30 may also use data from the gyroscope 44 to correct angular drift by activating pitch servos 45, yaw servos 46, or a combination of both. The microprocessor 30 may also control a tether servo 47 to wind and unwind the tether 110 (FIG. 1) from the spool 17 (FIG. 2). The microprocessor 30 and other control components may communicate via wireless signals when the tether 110 (FIG. 1) is disconnected. Accordingly, in one embodiment the microprocessor and/or other control components or sensors described herein may comprise wireless controls or sensors or a wireless data receiver or transceiver interface.

In one embodiment, an accelerometer 43 continuously measures and integrates accelerations in the three orthogonal physical planes of the aerial robotic lifting and observational platform 1 (FIG. 2). In one embodiment, the accelerometer 43 comprises an integrated circuit available from Analog Devices (ADI-16100 integrated 2 and 3 axis accelerometer).

In one embodiment, the aerial robotic lifting and observational platform 1 (FIG. 2) comprises an altimeter 41. The altimeter 41 allows the microprocessor to precisely hold altitude, or to ascend or descend in a controlled manner. The altimeter 41 may facilitate, for example, traversing a stairwell or transitioning between floors of a building. In one embodiment, the altimeter 41 is commercially available from, for example, VTI technologies (SCP 1000 Digital pressure sensor).

In one embodiment, the aerial robotic lifting and observational platform 1 (FIG. 2) comprises a global positioning (GPS) module 42. The GPS module 42 facilitate continuous monitoring of the position of the aerial robotic lifting and observational platform 1 (FIG. 2). The microprocessor 30 may act on the positional data provided by the GPS module 42 to allow the aerial robotic lifting and observational platform 1 (FIG. 2) to traverse particular paths. The GPS module 42 may also report back an actual GPS position of the aerial robotic lifting and observational platform 1 (FIG. 2) to the powered ground station 100 (FIG. 1). In one embodiment, the GPS module 42 comprises a NAVSYNC Technologies CW25-NAV miniature GPS receiver.

In one embodiment, an optical imager digital signal processor (DSP) circuit 40 may utilize built-in optical computational features of an optical mouse data pointing chip. Utilizing a suitable lens combination which is pointing toward the earth's surface, the optical imager DSP circuit 40 can update changes in physical position up to 6000 times per second. In one embodiment, the optical imager DSP 40 comprises an Agilent ADNS-3080 Optical Mouse Digital Signal Processing engine.

In one embodiment of the aerial robotic lifting and observational platform 1 (FIG. 2) including an observation device 12, the microprocessor may communicate with the observation device 12 as well as a pan servo 32, a tilt servo 34 operating the servomotors 13 (FIG. 2), and a zoom servo 35.

In one embodiment, the microprocessor 30, the optical imager DSP 40, the altimeter 41, the GPS module 42, the accelerometer 43, and the gyroscope 44 reside on printed circuit assembly 50. The printed circuit assembly 50 is shown in FIGS. 2 and 3.

In one embodiment, the aerial robotic lifting and observational platform 1 (FIG. 2) includes an active noise reduction DSP processor 300. Although much research has been conducted in the area of active noise reduction for long, simple ducts (see, for example, Kuo and Morgan, "Active Noise Control Systems," WILEY SERIES IN TELECOMMUNICATIONS AND SIGNAL PROCESSING 1995, ISBN 0-471-13424-4), the control of noise in short ducts, such as the duct 27 of FIG. 2, is not presently well understood or documented. Although some embodiments of the aerial robotic lifting and observational platform 1 (FIG. 2) have a noise spectra which is in part comprised of periodic and regularly recurring frequencies (derived from the rotational speed of the propellers 3, 11 and the motors 210a, 210b) and thus can be predicted, there is also un-correlated noise. Some of the un-correlated noise may result from the highly turbulent and chaotic airflow separation from structural elements located adjacent to and in the path of the high velocity airstream 22 (FIG. 2).

Noise resulting from turbulent and chaotic airflow separation or other sources is undesirable in many circumstances. Therefore, some embodiments of the aerial robotic lifting and observational platform 1 (FIG. 6) may comprise a noise reduction or reduction system. Passive absorption and dampening, which can be used in large ducted fan structures, is of limited effect for a small and compact ducted fans such as one embodiment described above. Therefore, one embodiment of the aerial robotic lifting and observational platform 1 illustrated in FIG. 6 includes an active noise reduction system.

Figure 6:
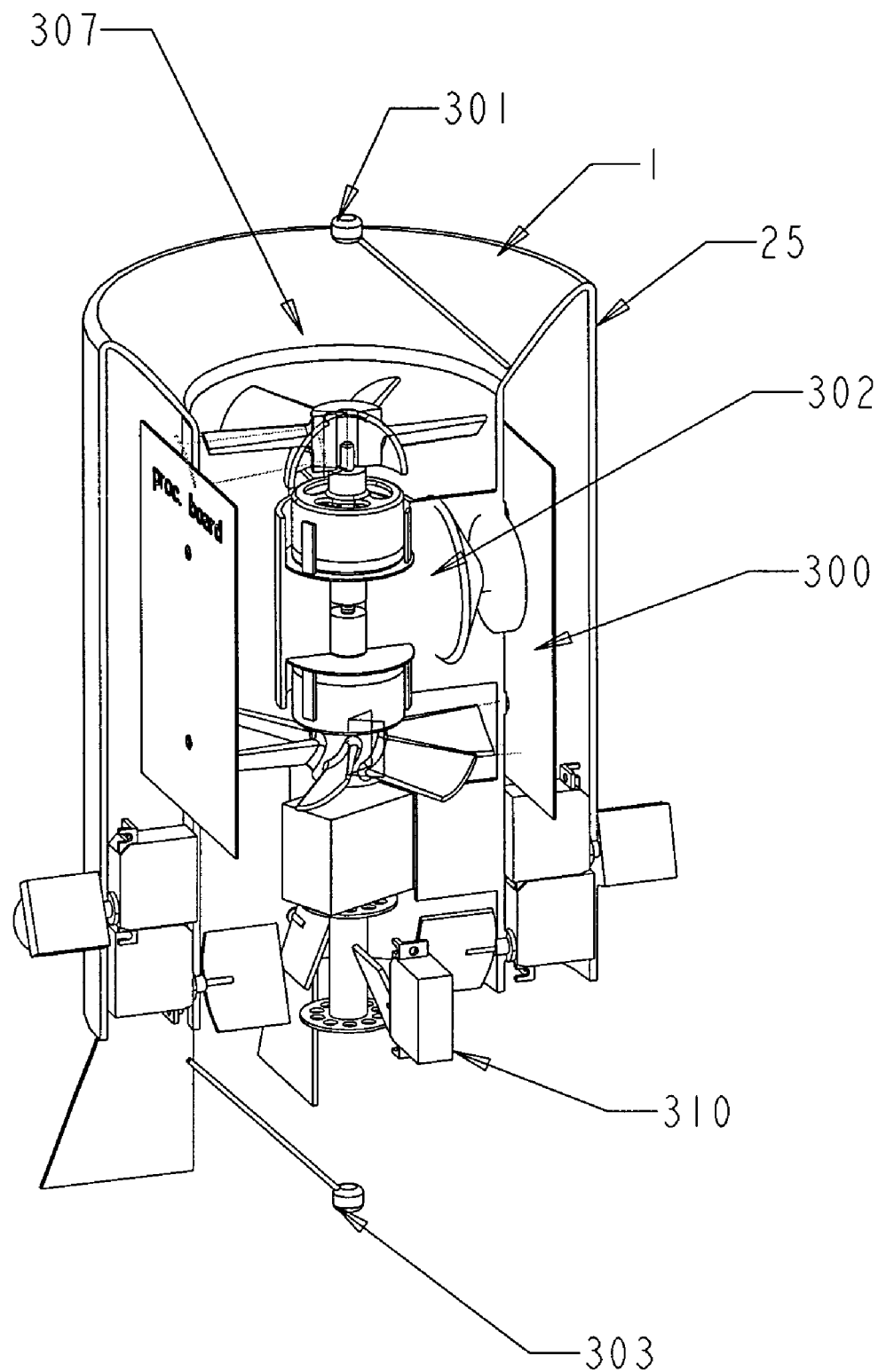
FIG. 6 is a cut away perspective view of one embodiment of an aerial robot illustrating placement of an active noise reducing system.

The active noise reduction system of FIG. 6 comprises a first error pick-up microphone 301 attached to the housing 25 at an air inlet 305, and a second error pick-up microphone 303 attached to the housing 25 at an airflow outlet 310. The second error pick-up microphone 303 faces away from the airflow. The aerial robotic lifting and observational platform 1 radiates acoustic noise from both the inlet 305 and outlet 310 apertures adjacent to the respective error pick-up microphones 301, 303. The frequency, spectral power content, and phase amplitude of the radiated acoustical sound pressures are surprisingly uniform at each of the first and second error pick-up microphones 301, 303. One reason for the uniformity may be the small dimensions of some embodiments of the present invention. The speed of sound at 75 degrees Fahrenheit and sea level conditions is approximately 343 meters per second (or about 13,514 inches per second). At a frequency of 7,000 hertz, the wavelength of acoustic energy is less than 2 inches. Thus, high frequency sounds generated within the aerial robotic lifting and observational platform 1 can easily propagate to either the inlet 305 or the outlet 310.

Classical active noise reduction systems tend to use an electrical speaker to create acoustic energy that is shifted out of phase 180 degrees from the original noise source requiring mitigation. Both the original acoustic noise and the 180 degree phase-shifted anti-noise propagate through a long duct before encountering a feedback acoustical pick-up microphone. By inputting (via an error pick-up microphone) the resultant noise following the addition of speaker anti-noise to the original source noise and applying a series of mathematical filtering and digital signal processing techniques, a processor computes and adjusts the required signal to be amplified and fed to the speaker. One computational method of creating such a feedback loop can be found in the in the article cited above by Kuo and Morgan. id.

According to one embodiment of the present invention, the use of a long duct is not practical. Likewise, the use of separate active noise control systems and anti-noise generating speakers at each of the inlet 307 and outlet 310 may not be practical. Two full and separate systems may contaminate and confuse one another. However, one embodiment uses a single active noise reduction system including a DSP circuit 300, a speaker 302, and two error sensing microphones 301 and 303. The active noise reduction system of FIG. 6 substantially reduces the acoustical noise broadcast by the aerial robotic lifting and observational platform 1.

In one embodiment of the active noise reduction system illustrated by FIGS. 5 and 6, a statistical least squares summing technique 305 is applied to the signals from the microphones 301, 303. The resultant sum is input to the DSP algorithms. In one embodiment, a single anti-noise signal is effectively fed to the speaker 302 to dramatically reduce any broadcast noise. Thus, unlike classical active noise reduction systems that require either single or multi-channel inputs and outputs, one embodiment of present invention utilizes two or more input error sensing microphones 301, 303 with appropriate mathematical or circuitry-generated statistical signal conditioning to create a single input and single output system. It is anticipated that numerous changes, additions, and substitutions to the above described active noise control system could be made without altering the novelty or inventive nature of the above-described solution. Moreover, some embodiments of the aerial robotic lifting and observational platform 1 may include any other noise reduction system or no noise reduction system at all.

Figure 7:
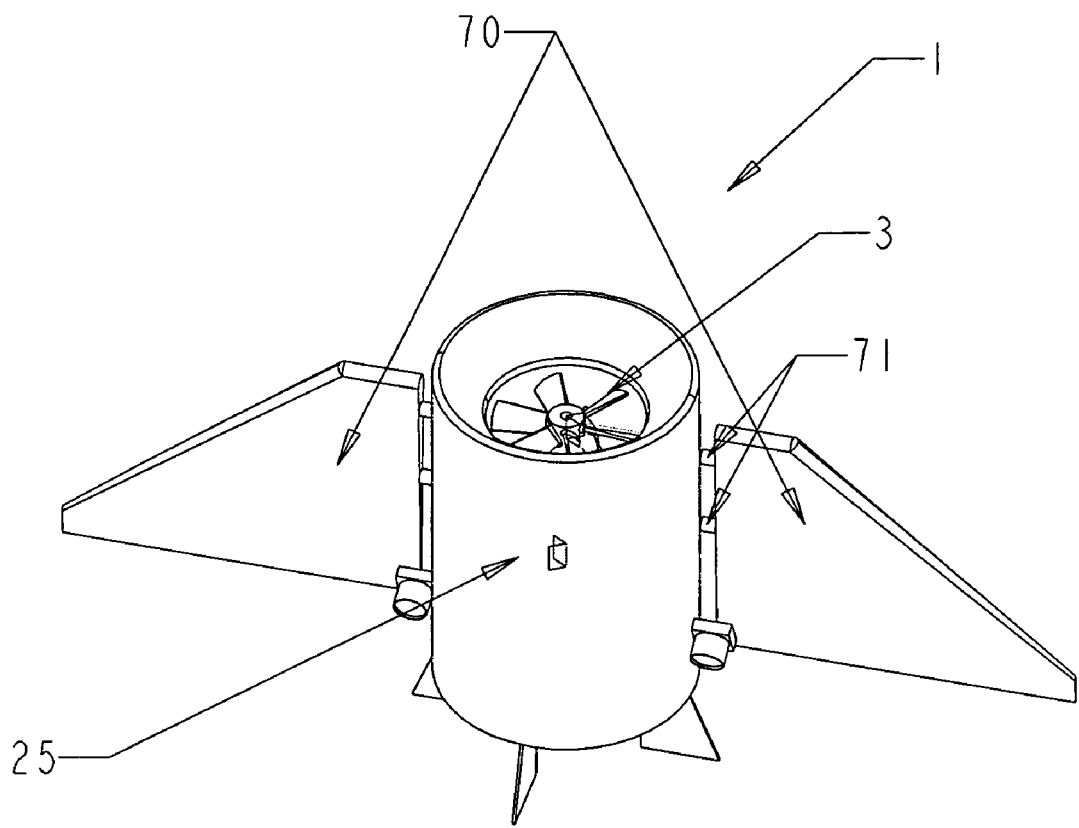
FIG. 7 is perspective view of one embodiment of an aerial robot including wings.

Referring next to FIG. 7, another embodiment of the aerial robotic lifting and observational platform 1 may include permanent or snap-on detachable wings 70. In the embodiment of FIG. 7, the wings 70 are permanently or temporarily attached to the body 25 by wing attachments 71. The addition of the wings 70 may permit the aerial robotic lifting and observational platform 1 to function more like a traditional unmanned aerial vehicle (UAV) when it is untethered. The wings 70 may facilitate level flight while powered by an on-board power source, such as the capacitor or other energy storage device 208 (FIGS. 4A-4B). Thus, in level flight, the wings 70 provide lift, while the propellers 3, 11 (FIG. 2) provide thrust to propel the aerial robotic lifting and observational platform 1 in a forward direction. In a level flight mode, great distances can be traversed because far less thrust is required for level flight than for hovering. Once the aerial robotic lifting and observational platform 1 reaches its target destination, it can easily revert to a stationary hover mode. When the aerial robotic lifting and observational platform 1 has completed its mission, it may return home with the remaining energy, or simply fall to earth and be recovered or destroyed.

Another embodiment of the aerial robotic lifting and observational platform 1 may facilitate simplified flight control calculations and implementations. For example, the embodiment of FIG. 8 includes structure that tends to simplify flight control. According to the embodiment of FIG. 8, the inside surface 31 of the duct houses the first and second propellers 3, 11 and the associated drive motors 210a, 210b. However, the aerial robotic lifting and observational platform 1 includes an elongated empennage tube 72. The elongated empennage tube 72 may have the servomotors 15, control fins 14, transformer 205, and printed circuit assembly 50 mounted or attached thereto. In one embodiment, the control fins 14 and associated servomotor pairs 15 are mounted at right angles to one another, with each pair of control surfaces moving in similar directions simultaneously or nearly simultaneously. Each pair of control fins 14 may define a single flight control surface if desired. These surfaces of the control fins 14, when actuated, cause a measurable angle of attack with respect to the on-coming high velocity airstream 22 (FIG. 2) from the first and second propellers 3, 11, and create a restoring moment to keep the aerial robotic lifting and observational platform 1 in a vertical orientation, or any other orientation so directed by the microprocessor 30 control block (FIG. 5).

In one embodiment, the spool 17 is connected between the housing 25 and the empennage 72. The spool 17 is positioned at or near the center of gravity of the aerial robotic lifting and observational platform 1. Therefore, tether wire 110 (FIG. 1), by virtue of its location at or near the center of gravity, becomes the pivoting balance point for the aerial robotic lifting and observational platform 1. Thus, the weight of the tether 110 (FIG. 1) does not add an appreciable moment to disrupt the airframe controllability because any tether forces act at the airframe center of gravity.

Figure 8:
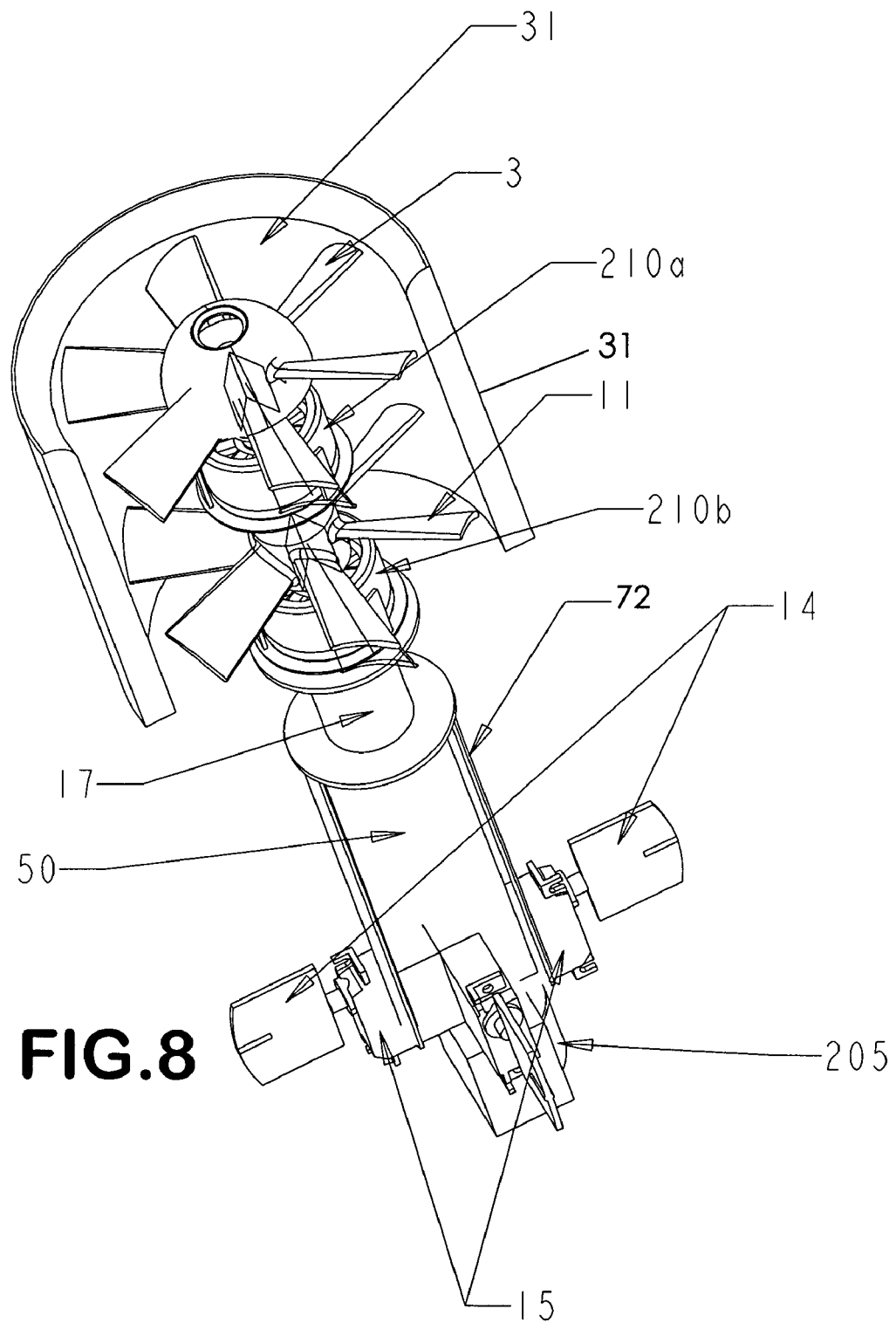
FIG. 8 is an internal perspective view of another embodiment of an aerial robot with an elongated empennage tube.

Further, using flight control surfaces located at a large distance (e.g. at least one housing 25 diameter) from the center of gravity of the airframe as shown in FIG. 8 allows the use of small flight control surfaces (e.g. control fins 14). Likewise, because the inertial masses of the highest-weight elements (housing 25, servomotors 15, and transformer 205) are located at significant distances (e.g. at least one housing 25 diameter) from the center of gravity, the entire system of the aerial robotic lifting and observational platform 1 exhibits a much lower resonant frequency than when inertial masses and flight control surfaces are near the center of gravity. Any tendency of the aerial robotic lifting and observational platform 1 to become unstable occurs much more slowly, and simplified flight control algorithms and actuators can be used without resorting to the complexities of non-linear control theory and the like that may be necessary otherwise. For example, the principles embodied in FIG. 8 may allow simple proportional/integral/differential (PID) flight control computations for each flight control axis.

Embodiments of the aerial robotic lifting and observational platform 1 may used in a variety of ways. A number of examples, which are not limiting, are mentioned below. In one aspect, the aerial robotic lifting and observational platform 1 may be equipped with a radio broadcast antenna and raised into the air to provide a temporary radio tower. The aerial robotic lifting and observational platform 1 may include a light and provide a temporary, portable light tower. The aerial robotic lifting and observational platform 1 may aid search and rescue operations. For example, the aerial robotic lifting and observational platform 1 may be equipped with cameras or other imagers that may provide visual data to search crews without subjecting personnel to potentially dangerous environments or circumstances. The aerial robotic lifting and observational platform 1 may also include sniffers or other sensors that detect chemical or biological agents and local atmospheric conditions. The sensors may, for example, detect carbon dioxide levels, carbon monoxide levels, hydrogen sulfide levels, or any other safe, noxious, or toxic fumes. The aerial robotic lifting and observational platform 1 may include sensors measuring temperature, pressure, or other conditions. The aerial robotic lifting and observational platform 1 may also provide one-way or two-way communication between parties in remote locations, such as rescuers and victims, or police and hostages. The aerial robotic lifting and observational platform 1 may deliver items from one party to another. For example, the aerial robotic lifting and observational platform 1 may hold and deliver a telephone, first aid supplies, weapons, or other items. Accordingly, the aerial robotic lifting and observational platform 1 may include a holder such as a box, arm, or other attached delivery device. Holder 23, as shown in FIG. 2, could deliver a first aid package, or cell phone, or other needed emergency article to a victim in distress. Conversely, such a holder could carry a remotely detonated munitions device, or electrical stun device, to immobilize a hostile adversary. Police, fire, SWAT, and military teams may use the aerial robotic lifting and observational platform 1 to find safe entry areas, victims, suspects, etc. The aerial robotic lifting and observational platform 1 may be used to assess or inspect threats without exposing personnel. The aerial robotic lifting and observational platform 1 could comprise an ordinance delivery tool to immobilize suspects or others. For example, the aerial robotic lifting and observational platform 1 could deliver tear gas, tasers, grenades, or other ordinances. In some aspects, the aerial robotic lifting and observational platform 1 could provide security by monitoring a stationary area or patrolling a perimeter. The aerial robotic lifting and observational platform 1 could provide aerial traffic information or be used for television, movies, and sports events when equipped with a camera or other observation device.

The preceding description has been presented only to illustrate and describe certain aspects, embodiments, and examples of the principles claimed below. It is not intended to be exhaustive or to limit the described principles to any precise form disclosed. Many modifications and variations are possible in light of the above teaching. Such modifications are contemplated by the inventor and within the scope of the claims. The scope of the principles described is defined by the following claims.

What is claimed is:

1. An apparatus, comprising:
   (a) an aerial robot, the aerial robot comprising:
      (i) a first propeller for rotating in a first direction;
      (ii) a second propeller for rotating in a second direction opposite of the first direction;
      (iii) an observation device;
      (iv) at least one motor coupled to the first and second propeller that rotates the propellers; and
      (v) a low-voltage power supply interconnected with the at least one motor;
   a power supply;
   (b) a high-voltage power supply; and
   (c) a transmission line interconnecting the high-voltage power supply and the aerial robot;
   wherein the transmission line transmits power from the high-voltage power supply to the aerial robot and provides bi-directional communication to and from the aerial robot, wherein the low-voltage power supply transforms the power from the transmission line from a higher voltage to a lower voltage and provides the lower voltage to the at least one motor.

2. An apparatus according to claim 1 wherein the transmission line comprises a controlled impedance wire that transmits power from the high-voltage power supply to the aerial robot and provides bi-directional communication to and from the aerial robot.

3. An apparatus according to claim 1 wherein the transmission line comprises an electrical power line and an optical fiber communication line.

4. An apparatus according to claim 1 wherein the aerial robot further comprises an internal spool, wherein at least a portion of the transmission line is wound on the internal spool.

5. An apparatus according to claim 1 wherein the aerial robot further comprises an internal spool, wherein:
   at least a portion of the electrical transmission line is wound on the internal spool;
   the transmission line comprises a tether wire pair;
   a nominal diameter of each wire of the tether wire pair is 0.005 inches or less and is covered with a dielectric insulator.

6. An apparatus according to claim 1 wherein the high-voltage power supply provides power at a voltage of 500V or higher.

7. An apparatus according to claim 1 wherein the high-voltage power supply provides power at a voltage of 1000V or higher.

8. An apparatus according to claim 1 wherein the aerial robot further comprises:
   (vi) an internal duct comprising an inlet and an outlet, wherein the first and second propellers are disposed in the internal duct; and
   (vii) first and second movable air foils at the outlet of the internal duct to control movement of the aerial robot.

9. An apparatus according to claim 1 wherein the aerial robot comprises dimensions no greater than four inches by four inches by seven inches.

10. An apparatus according to claim 1 wherein the aerial robot and the high voltage power supply each comprises a spool connected to the transmission line, wherein at least one of the spools is powered.

11. An apparatus according to claim 1 wherein the observation device comprises at least one of: a camera, a sensor, and a microphone.

12. An apparatus according to claim 1 wherein the aerial robot further comprises a delivery device that delivers a payload from the aerial robot.

13. An apparatus according to claim 1 wherein the aerial robot further comprises an active noise reduction system that reduces noise in audible frequency ranges.

14. An apparatus according to claim 1 wherein the aerial robot further comprises an active noise reduction system that comprises at least two microphones, a digital signal processing microprocessor, and a speaker.

15. An apparatus according to claim 1 wherein the aerial robot further comprises a control system for providing hover stability, the control system comprising a microprocessor, a micro-machined gyroscope, and a micro-machined accelerometer.

16. An apparatus according to claim 1 wherein the aerial robot further comprises a flight control system, the flight control system comprising an optical digital signal processor circuit capable of maintaining aerial robot position while optically referenced to a ground object.

17. An apparatus according to claim 1 wherein the low-voltage power supply comprises a self contained power source and wireless control sensors.

18. A flying robot apparatus, comprising:
   a body;
   an internal duct through the body;
   at least one pair of counter-rotating propellers disposed in the internal duct;
   first and second remotely operated control fins;
   at least a first motor that rotates the counter-rotating propellers and receives power that is less than 24 volts;
   wherein the dimensions of the flying robot do not exceed approximately six inches by six inches by eight inches.

19. An apparatus according to claim 18 wherein the dimensions of the flying robot do not exceed the dimensions of a cylinder having a diameter of five inches and a height of seven inches.

20. An apparatus according to claim 18 wherein the dimensions of the flying robot do not exceed the dimensions of a cylinder having a diameter of four inches and a height of six inches.

21. An apparatus according to claim 18 further comprising a radio broadcast antenna.

22. An apparatus according to claim 18, further comprising a tether connected to the flying robot, the tether comprising a power transmission line and a bi-directional communication line.

23. An apparatus according to claim 18 further comprising a device delivery holder.

24. An apparatus according to claim 18 further comprising a spool and a tether at least partially wound on the spool, the tether comprising a power transmission and a bi-directional communication line.

25. An apparatus according to claim 18 further comprises an on-board camera movable to multiple positions with respect to the flying robot.

26. An apparatus, comprising:
(a) an aerial robot, the aerial robot comprising:
  (i) a body;
  (ii) at least one pair of counter-rotating propellers mounted to the body;
  (iii) an observation device mounted to the body;
(b) a remote communication center; and
(c) a secure communication link connected between the aerial robot and the remote communication center that provides both power and communications to the aerial robot through a controlled impedance wire.

27. The apparatus according to claim 26 wherein the secure communication link comprises a controlled impedance wire of 35 gauge or smaller that transmits power from the remote communication center to the aerial robot and provides bi-directional communication to and from the aerial robot.

28. The apparatus according to claim 26 wherein the secure communication link further comprises a fiber optic cable.

29. The apparatus according to claim 26 wherein the aerial robot comprises a powered rotating spool and at least one thousand feet of wire wound on the spool.

30. The apparatus according to claim 26 wherein the aerial robot comprises:
an internal duct inside the body, the internal duct comprising an inlet and an outlet, wherein the at least one pair of counter-rotating propellers are disposed in the internal duct;
first and second orthogonal, movable air foils at an outlet of the internal duct to control movement of the aerial robot.

31. The apparatus according to claim 26 wherein the aerial robot comprises a cylinder having a diameter of no more than five inches and a length of no more than eight inches.

32. A method, comprising:
flying an aerial robot, the flying an aerial robot comprising:
  counter rotating a pair of aerial robot propellers;
  navigating the aerial robot through a confined space;
  providing power to the aerial robot at a high voltage through a tether;
  transforming the high voltage power from the tether to a low voltage power;
  powering the aerial robot with the low voltage power; and
  securely communicating bi-directionally with the aerial robot.

33. A method according to claim 32, further comprising reducing audible noise from a microphone mounted to the aerial robot with a single input, single output, active noise reduction system.

34. An apparatus, comprising:
an aerial robot, the aerial robot comprising:
  a duct housing;
  a first propeller for rotating in a first direction disposed in the duct housing;
  a second propeller for rotating in a second direction opposite of the first direction disposed in the duct housing;
  an elongated empennage attached to and extending away from the duct housing;
  a spool connected to the elongated empennage located at an approximate center of gravity of the aerial robot;
  an electrical transmission line at least partially wound on the spool comprising a controlled impedance wire;
  at least one aileron fin mounted to the elongated empennage and spaced from the duct housing;
  wherein the controlled impedance wire both transmits power to the aerial robot and provides bi-directional communication to and from the aerial robot.

35. An apparatus according to claim 34 wherein the aerial robot further comprises:
a servomotor operatively attached to each of the at least one aileron fins and mounted to the elongated empennage;
a transformer mounted to the elongated empennage.

* * * * *